United States Patent
Pemberton et al.

(10) Patent No.: US 7,609,459 B2
(45) Date of Patent: Oct. 27, 2009

(54) SHUTTER DEVICE FOR INFRA-RED IMAGING SYSTEMS

(75) Inventors: Ben Pemberton, Cambridge (GB); Richard Salisbury, Cambridge (GB)

(73) Assignee: Thermoteknix Systems Limited, Waterbeach, Cambridge (GB)

( * ) Notice: Subject to any disclaimer, the term of this patent is extended or adjusted under 35 U.S.C. 154(b) by 0 days.

(21) Appl. No.: 11/277,787

(22) Filed: Mar. 29, 2006

(65) Prior Publication Data

US 2006/0219940 A1    Oct. 5, 2006

(30) Foreign Application Priority Data

Mar. 29, 2005    (GB) ................................. 0506272.4

(51) Int. Cl.
*G02B 9/00* (2006.01)
*G03B 9/10* (2006.01)

(52) U.S. Cl. .................... 359/739; 359/740; 396/493; 396/495

(58) Field of Classification Search ......... 359/738–740; 396/452, 493, 495
See application file for complete search history.

(56) References Cited

U.S. PATENT DOCUMENTS

| 3,709,134 | A |   | 1/1973  | Kitai |
|-----------|---|---|---------|-------|
| 4,486,084 | A |   | 12/1984 | Sato et al. |
| 5,577,840 | A | * | 11/1996 | Tomita ....................... 374/130 |
| 6,657,796 | B2 | * | 12/2003 | Greenberg .................. 359/738 |
| 6,899,472 | B2 | * | 5/2005  | Takahashi et al. ........... 396/463 |
| 6,975,464 | B2 | * | 12/2005 | Seita .......................... 359/739 |

* cited by examiner

*Primary Examiner*—Jack Dinh
(74) *Attorney, Agent, or Firm*—Barlow, Josephs & Holmes, Ltd.

(57) ABSTRACT

A shutter for an infra-red imaging camera comprises shaped first and second elements (17, 18) which are movable relative to each other, between open and closed positions. In the open position, the elements (17, 18) overlie each other leaving a clear optical path through the camera. In the closed position, the elements (17, 18) are disposed side-by-side and completely block off the optical path through the camera.

19 Claims, 3 Drawing Sheets

SHUTTER DEVICE FOR INFRA-RED IMAGING SYSTEMS

This invention relates to a shutter device particularly for infra-red imaging systems.

Infra-red imaging systems, may be provided as thermal cameras to make a permanent record of images captured, on a recording mechanism such as infra-red sensitive film, or a digital device such as a microbolometer or CCD, or may be provided with an image converter for visual use, and may be cooled or uncooled.

In an uncooled infra-red imaging system, such as a digital CCD, or film camera, there is a requirement to insert a uniform surface into the radiation path to allow for image correction. The uniform surface is commonly referred to as a shutter which operates by non-uniformity correction. The shutter has traditionally been a single element paddle, driven by a motor, possibly with a gear system and the shutter is swung in and out of the optical path. It is thus similar in structure if not in function, to the exposure control shutter used in visual light cameras. The problem is that the shutter takes up a large amount of space when out of the radiation path.

Adoption of an iris design, of the type widely used on visual light cameras, does not significantly reduce the space required, although it is disposed more in the optical axis, and more symmetrical with respect to the axis, and it is also a much more complicated design because of the number of moving elements involved.

It is an object of the invention to provide a shutter construction which occupies less volume than the traditional single paddle shutter, and is relatively simple in construction.

In accordance with the invention, a shutter device in an infra-red imaging system comprises two or more elements which can be moved out of the radiation path to rest in an overlapping manner.

The two or more elements may be mounted on a common axis of rotation which is disposed eccentrically of the optical axis of the imaging device, so as to be capable of movement about the axis between an open position where the elements are overlapped, and leave a window of the detector device such as a germanium window, unobstructed, and a closed position wherein the elements are expanded or unfurled to effectively cover the said window, in a manner similar to the folding and unfolding of a fan.

The elements may comprise a first element which has an edge shaped to match the outer circumference of light path to the window so that when the shutter is open, with the shutter elements retracted, the said edge abuts the circumference so as to leave the window unobstructed and to occupy the minimum area outside of the light path. The next successive element preferably has an edge which is complementary to the said edge of the first shutter element, and the complete set of elements are complementarily shaped with respect to each other, to effectively completely obstruct the light path to the window when expanded or unfurled.

Rotation of the shutter on the eccentrically disposed axis may be accomplished by providing a rotary drive element such as a motor, or a torsion spring disposed along the axis, which is arranged to rotationally displace the last element through the full extent of an arc of rotation, and by means of lost motion devices, entrain the successive shutter elements through respective lesser arcs of rotation. The lost motion device may comprise a pin or hinge which engages in progressively longer slots in the successive shutter elements, the pin being arranged to be rotated by the drive element.

A preferred embodiment of shutter device according to the invention will now be described by way of example, with reference to the accompanying drawings wherein.

Figure 1:
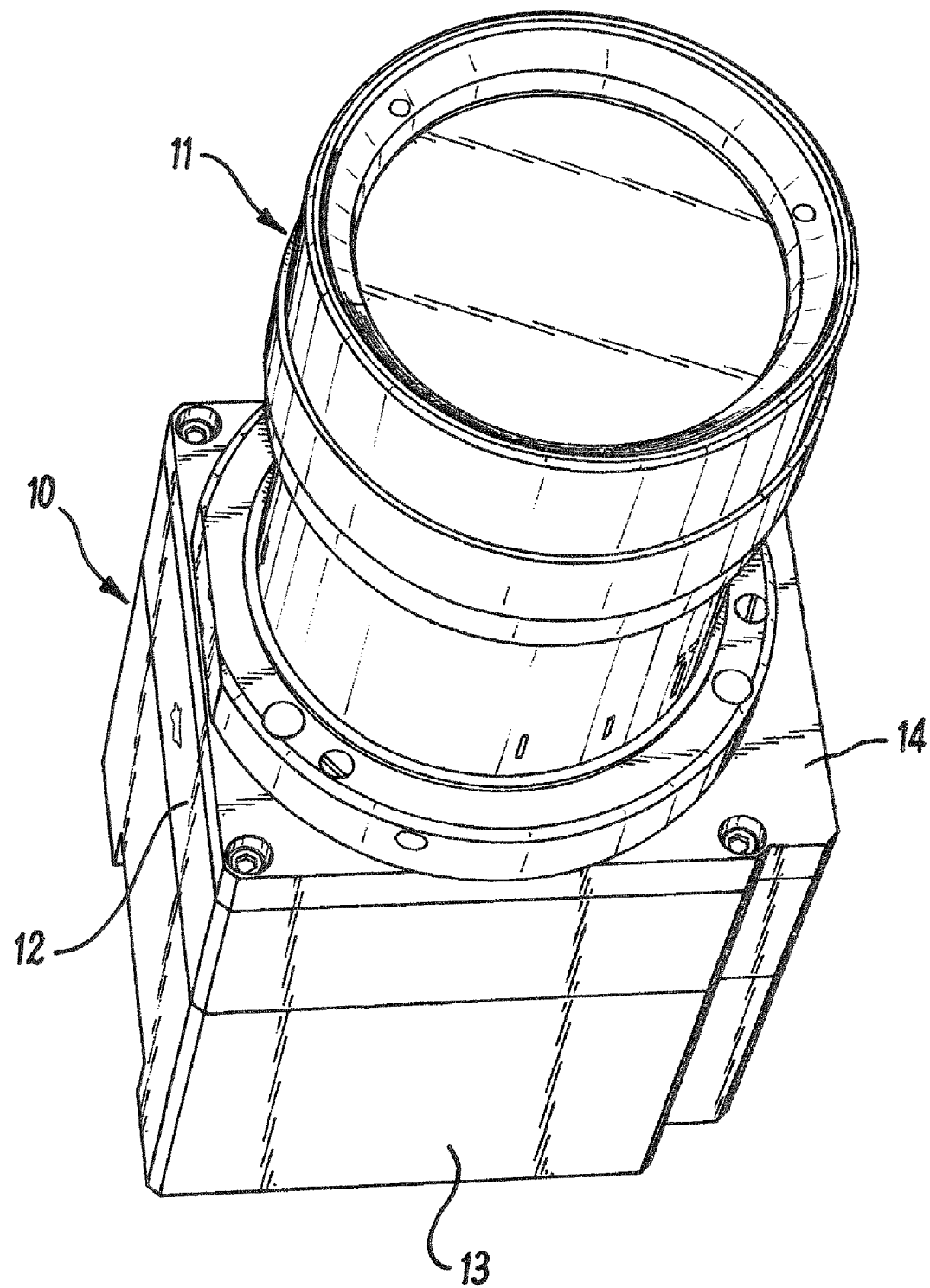
FIG. 1 is a perspective view of a thermal (infra-red) imaging camera, incorporating a shutter device according to the invention.

As shown in FIG. 1, a thermal (infra-red) imaging camera has a body 10 and an objective lens system 11. The latter may comprise a compound variable focal length objective system of the type known as a telephoto lens, which can vary in focal length and therefore in the scale of the image formed. The body comprises a shutter housing 12, and a back 13, the former incorporating the radiation sensing and recording element which comprises a microbolometer but which may be a CCD device or other electronic device of suitable characteristics, but could be a photo-chemical film or plate and the latter containing control circuits and other electronic components.

Figure 2:
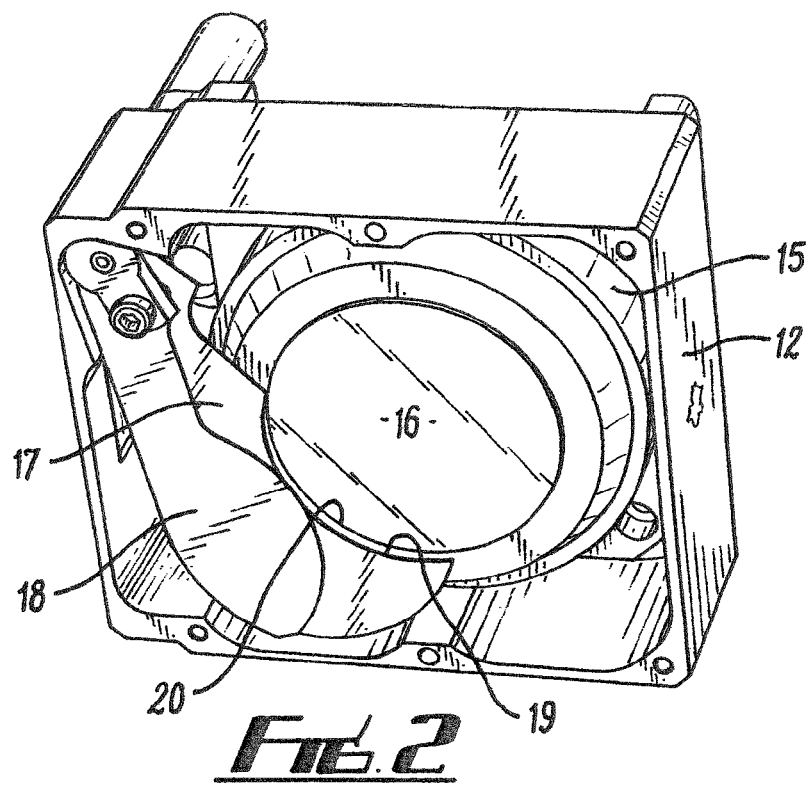
FIG. 2 is a perspective view of a shutter housing forming part of the camera of FIG. 1 showing the shutter device "open", that is not obstructing the aperture.
Figure 3:
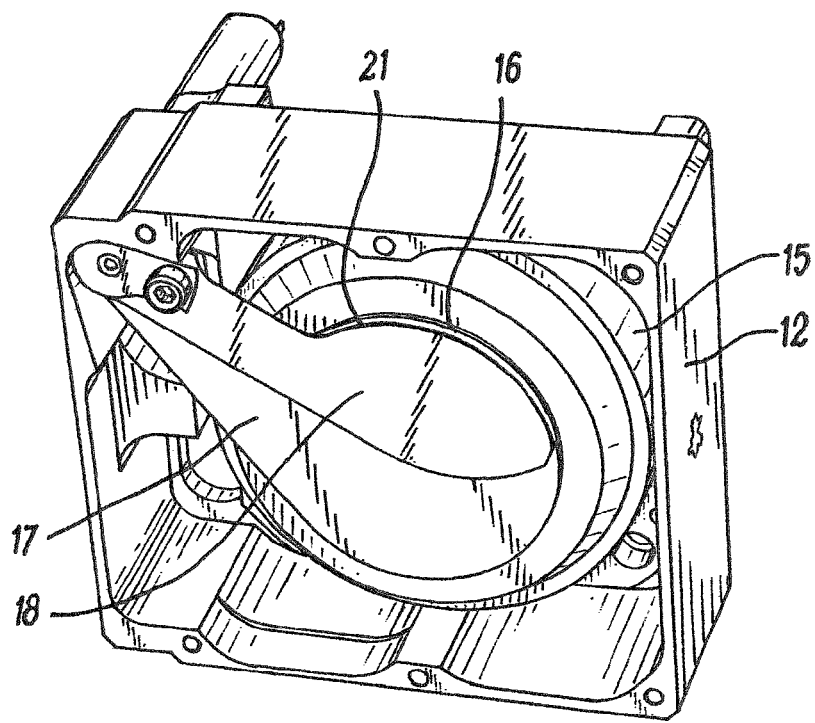
FIG. 3 is a view similar to FIG. 2, showing the shutter device "closed" that is completely obstructing the aperture.

FIGS. 2 and 3 show the interior of the shutter housing 12 after removal of a lens mounting plate 14.

The housing has a detector unit 15 with a germanium window 16, through which light focused by the objective lens system 11 can enter to strike the radiation sensing and recording element in the unit 15.

The shutter housing 12 also encloses a shutter device which comprises a two element shutter comprising a first element 17 and a second element 18.

In FIG. 2, this is shown "open" with the first element 17 disposed so that an arcuate edge 19 thereof matches and coincides with a part 20 of the periphery of the window 16, leaving optical path to the latter clear.

The second element 18 is disposed to wholly overlie the first element when they are retracted into this "open" position so that the minimum possible area or volume is occupied.

In FIG. 3 on the other hand, the shutter is shown "closed" so that the optical path of the window 16 is fully covered by the two element shutter, the second element 18 having an edge 21 which matches the curvature of the periphery of the window 16, and the elements 17 and 18 fully covering the aperture 16 when thus unfurled. In the closed position, the shutter elements slightly overlap to ensure there is no gap to allow radiation through, and to prevent the shutters crossing over each other during operation.

The operation of the shutter may be compared to the opening and closing of a fan.

Figure 4:
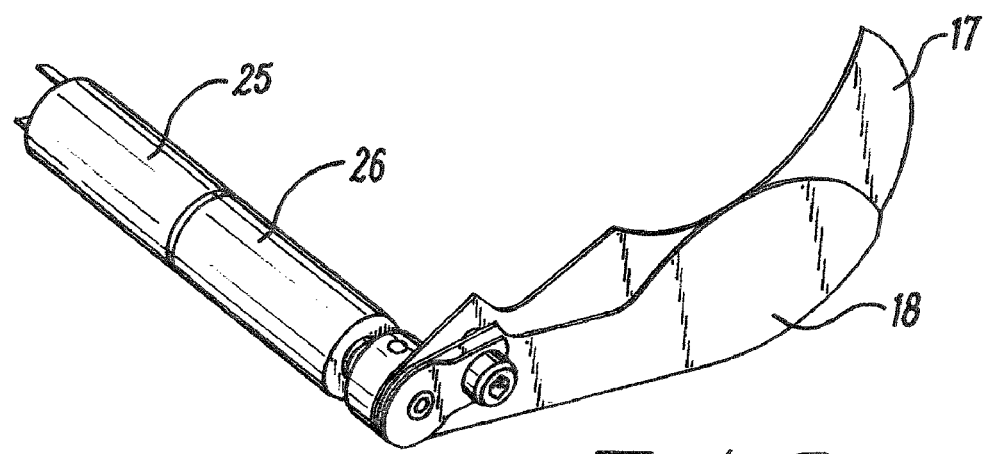
FIG. 4 is a perspective view of the shutter device and shutter device mechanism.
Figure 5:
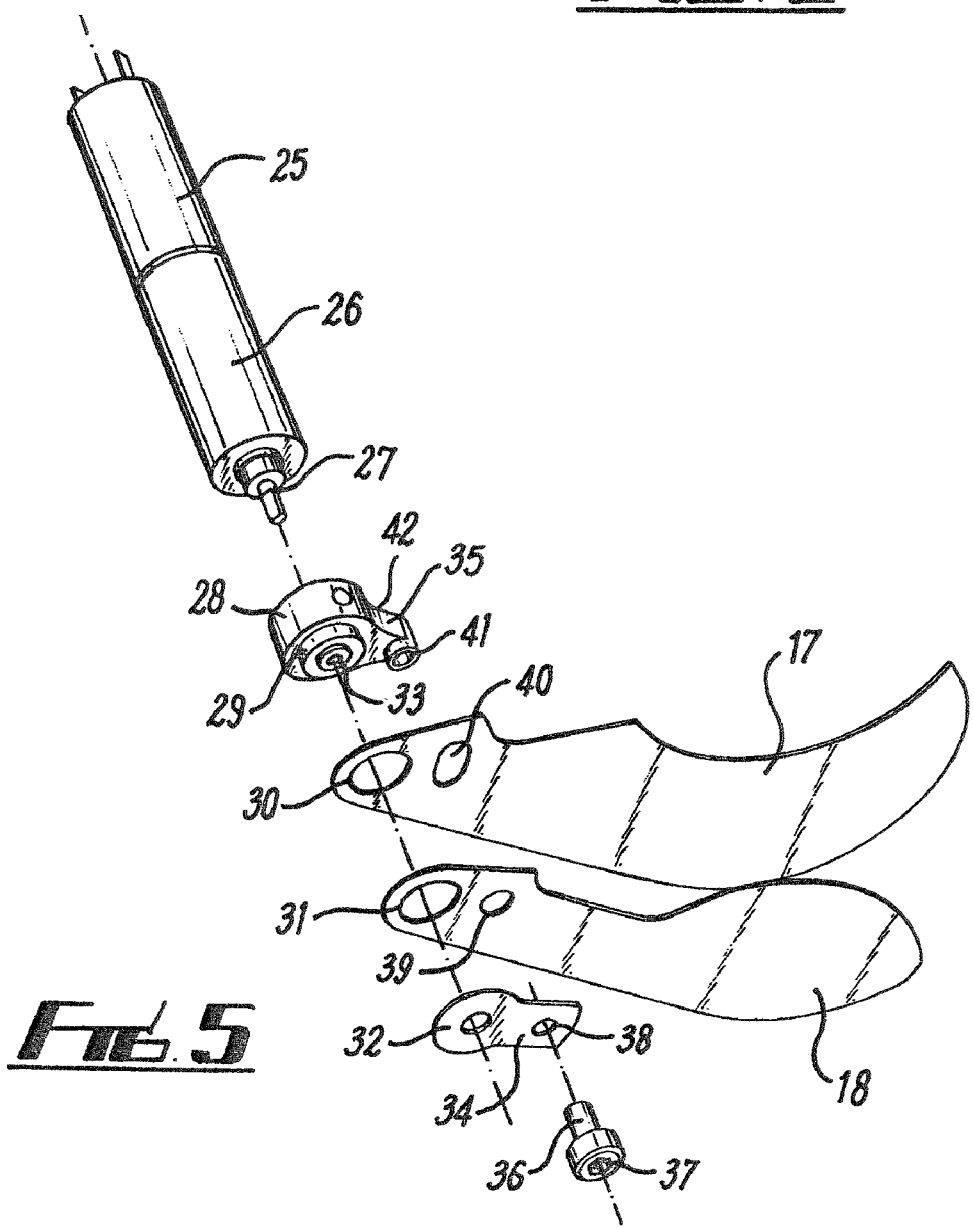
FIG. 5 is an exploded view of the shutter device and shutter drive mechanism of FIG. 4.

FIGS. 4 and 5 show the arrangement whereby the shutter is operated. A shaft includes a motor 25 and a gear box 26 which is driven by a battery or other power source associated with the camera, and has an output shaft 27 with flat end faces engaging with grub screws in a rotatable boss 28. This has a two stage stepped protrusion thereon with a first stage 29 which passes through apertures 30, 31 in the shutter elements 17, 18 respectively, and a second reduced stage 33, which receives a shutter retainer 32 which has an arm 34, matching an arm 35 of boss 28. A screw 36, having a head socket 37 which can be engaged by an Allen key or a Phillips screwdriver passes through an aperture 38 in the arm 34 of the retainer 32, a further aperture 39 in the shutter section 18, an arcuate slot 40 in the shutter section 17, and a threaded bore 41 on an arm 42 of the boss 28.

By this means, when the motor rotates the shaft 27 the arms 42, 34 rotate, also causing the shutter section 18 to be rotated and swung out over the window 16. The slot 40 provides for a degree of lost motion, so that the shutter element 17 is not moved at first, and is then displaced to follow the element 18 so that it lies over the window 16 behind the element 18 to complete the occlusion of the optical part of the window.

The radiation sensitive element in a preferred embodiment may be a microbolometer, which is an uncooled digital device for measuring radiation. The sectors 17, 18 of the shutter device may be of different materials to enable measurement using both uniform and non-uniform surfaces as a means of calibration. Measurements can be taken over a front or back surface of the sectors 17, 18 for the same purpose.

The temperature of the shutter may be measured by a contact thermistor or a spot radiometer for calibration purposes. This may be used in a comparative procedure where the shutter temperature is used as a reference value for differential radiometry, involving using the radiation sensor to first read the signal from the shutter, then after opening the shutter read the signal from an object. This may be repeated several times to produce mean readings, and improved accuracy of temperature measurement. Calibrations may be carried out using more than one shutter arrangement, e.g. by adding a part closed position for use with more than one reference such as different coatings. For example, by using two coatings, say a different one on each shutter element, of different emissivity, or reflectance, that a gain and offset calibration can be performed. Alternatively, the respective sectors 17, 18 can be of different material.

The shutter device according to the invention is simple and compact. Whilst described as comprising two shutter elements, these may comprise a suitable number. Generally a larger number of elements can be more compact, but add complexity so the optimum is probably two or three elements. In place of an electric motor drive for the shutter, a torsion/spring arrangement may be used, for example.

it will of course to be understood that the invention is not intended to be restricted to the details of the above embodiment which is described by way of example only.

The invention claimed is:

1. A shutter device in an infra-red imaging system comprises a circular window, two or more elements which are mounted on a common axis of rotation which is disposed eccentrically of an optical path of the imaging device and which can be moved out of the radiation path to rest in an overlapping manner, said two or more elements defining a fan-like shape comprise a first element which has a curved edge to match the outer circumference of the light path to the window whereby when the shutter is opened, with the elements retracted, the said edge abuts the circumference so as to leave the window unobstructed and the second and all subsequent elements are disposed to wholly overlie the first element so as to occupy the minimum area outside of the light path.

2. A shutter device according to claim 1 in which a next successive element has an edge which is complimentary to the edge of the first shutter element, for abutment therewith.

3. A shutter device according to claim 1 in which all said elements are complementarily shaped with respect to each other such that they can abut together to completely obstruct the light path to the window when the elements are expanded or unfurled.

4. A shutter device according to claim 1 wherein the rotation of the shutter on said eccentrically disposed axis, is accomplished by providing a rotary drive element which is arranged to rotationally displace the last element through the full extent of the arc of rotation, and, by means of lost motion devices, entrain the successive shutter elements through lesser arcs.

5. A shutter device according to claim 4 wherein the rotary device element comprises a motor.

6. A shutter device according to claim 4 wherein the rotary device comprises a torsion spring disposed along the rotation axis.

7. A shutter device according to claim 4 wherein said lost motion device comprises a pin or a hinge which engages in slots of increasing length in the successive shutter elements, the pin being arranged to be rotated by the drive element.

8. A shutter device according to claim 1 wherein the elements are of different materials.

9. A shutter device according to claim 1 wherein a contact thermistor is provided, which thermistor can measure the temperature of the shutter device.

10. A shutter device in an infra-red imaging system comprises a circular window, two or more elements which are mounted on a common axis of rotation which is disposed eccentrically of an optical path of the imaging device and which can be moved out of the radiation path to rest in an overlapping manner, said two or more elements defining a fan-like shape comprise a first element which has a curved edge to match the outer circumference of the light path to the window whereby when the shutter is opened, with the elements retracted, the said edge abuts the circumference so as to leave the window unobstructed and the second and all subsequent elements are disposed to wholly overlie the first element so as to occupy the minimum area outside of the light path whereby the elements are expanded and uncurled to cover the window similar to the folding and unfolding of a fan.

11. A shutter device suitable for use in an infra-red imaging system to allow for image correction therein comprises a circular window, two or more elements which are mounted on a common axis of rotation which is disposed eccentrically of an optical path of the imaging device and which can be moved out of the radiation path to rest in an overlapping manner, said two or more elements defining a fan-like shape comprising a first element which has a curved edge to match the outer circumference of the light path to the window whereby when the shutter is opened, with the elements retracted, the said edge abuts the circumference so as to leave the window unobstructed and the second and all subsequent elements are disposed to wholly overlie the first element so as to occupy the minimum area outside of the light path, the next successive element having an edge which is complimentary to the edge of the first shutter element for abutment therewith, said elements defining a fan-like shape with respect to each other such that they can abut together to completely obstruct the light path to the window when the elements are expanded, the rotation of the shutter on said eccentrically disposed axis is accomplished by providing a rotary drive element which is arranged to rotationally displace the last element through the full extent of the arc of rotation, and, by means of lost motion devices, entrain the successive shutter elements through lesser arcs of rotation, whereby the elements are retracted or expanded similar to the folding and unfolding of a fan.

12. A shutter device according to claim 11 wherein the rotary device element comprises a motor.

13. A shutter device according to claim 11 wherein the rotary device element comprises a torsion spring disposed along the rotation axis.

14. A shutter device according to claim 11, further comprising a contact thermistor which can measure the temperature of the shutter device.

15. A shutter device according to claim 14, wherein the two or more elements are connected to a single shaft and mounted on a single axis of rotation.

16. A shutter device according to claim 11, wherein there are two elements.

17. A shutter device according to claim 11 wherein said lost motion device comprises a pin or a hinge which engages in slots of increasing length in the successive shutter elements, the pin being arranged to be rotated by the drive element.

18. A shutter device according to claim 11 wherein the elements are made of different materials.

19. A shutter device suitable for use in an infra-red imaging system to allow for image correction therein comprises a circular window, two or more elements which are mounted on a common axis of rotation which is disposed eccentrically of an optical path of the imaging device and which can be moved out of the radiation path to rest in an overlapping manner, said two or more elements defining a fan-like shape comprise a first element which has a curved edge to match the outer circumference of the light path to the window whereby when the shutter is opened, with the elements retracted, the said edge abuts the circumference so as to leave the window unobstructed and the second and all subsequent elements are disposed to wholly overlie the first element so as to occupy the minimum area outside of the light path.

* * * * *